United States Patent [19]

Leitgeb

[11] 4,323,370
[45] Apr. 6, 1982

[54] ADSORPTION PROCESS PRODUCING VARYING AMOUNTS OF PRODUCT GAS OF A CONSTANT PURITY

[75] Inventor: Paul Leitgeb, Munich, Fed. Rep. of Germany

[73] Assignee: Linde Aktiengesellschaft, Hollriegelskreuth, Fed. Rep. of Germany

[21] Appl. No.: 156,946

[22] Filed: Jun. 6, 1980

[30] Foreign Application Priority Data

Jun. 8, 1979 [DE] Fed. Rep. of Germany ....... 2923325

[51] Int. Cl.³ ............................................. B01D 53/04
[52] U.S. Cl. ......................................... 55/18; 55/68; 55/75
[58] Field of Search .................... 55/18, 20, 21, 58, 62, 55/68, 74, 75

[56] References Cited

U.S. PATENT DOCUMENTS

| | | | |
|---|---|---|---|
| 3,257,772 | 6/1966 | Maddox et al. | 55/21 X |
| 3,923,477 | 12/1975 | Armond et al. | 55/25 |
| 4,021,211 | 5/1977 | Turek et al. | 55/18 |
| 4,140,495 | 2/1979 | Pietruszewski | 55/21 |
| 4,197,095 | 4/1980 | White, Jr. et al. | 55/75 X |

FOREIGN PATENT DOCUMENTS

2702785 7/1978 Fed. Rep. of Germany .

OTHER PUBLICATIONS

Breck, Zeolite Molecular Sieves, Structure, Chemistry, and Use, 1974, John Wiley & Sons, Inc., pp. 671–688.

*Primary Examiner*—Robert H. Spitzer
*Attorney, Agent, or Firm*—Millen & White

[57] ABSTRACT

A cyclic adsorption process for the fractionation of a gaseous mixture, over an adsorbent exhibiting differential rates of adsorption for the components of the gaseous mixture. The process delivers a product gas of a constant concentration by varying the length of time of the adsorption phase and the rate of flow of the product gas from the adsorber, in response to a varying demand for the product gas. The rate of flow of a feed gas is varied in relationship to the rate of flow of the product gas. The rates of flow of the feed gas and of the product gas and the length of time of the adsorption cycle are determined from a correlation of the rate of flow of the product gas as a function of the product gas purity. The correlation is established experimentally for each feed/product gas combination.

12 Claims, 1 Drawing Figure

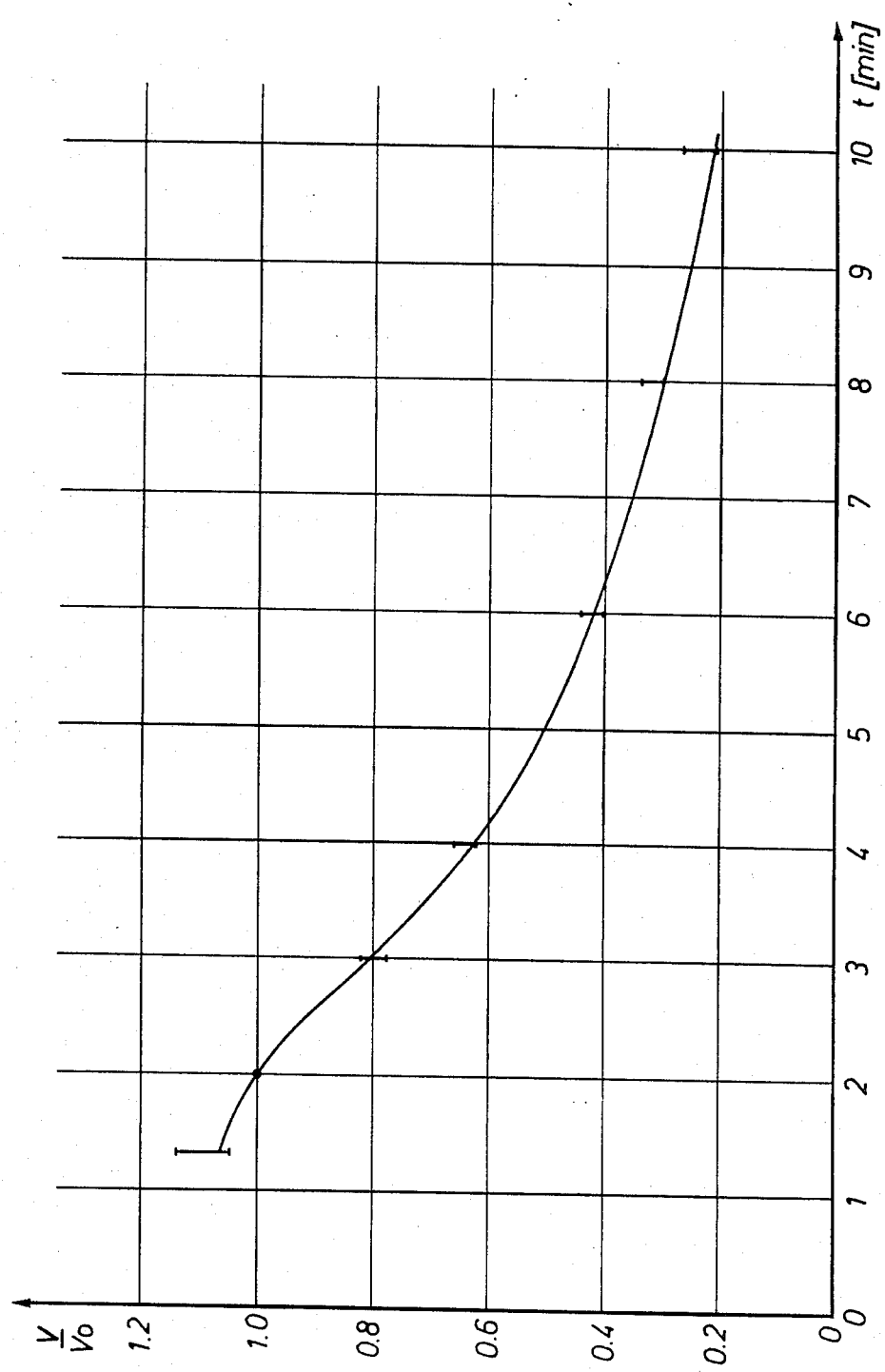

ADSORPTION PROCESS PRODUCING VARYING AMOUNTS OF PRODUCT GAS OF A CONSTANT PURITY

BACKGROUND OF THE INVENTION

This invention relates to an adsorption process for the fractionation or purification of a gaseous mixture. More particularly, the invention relates to an adsorption process for the production of a product gas of substantially constant content of the desired gaseous component.

In addition to the frequently employed adsorption processes wherein the separation of the components of gaseous feed mixtures is based on different equilibrium points of the adsorbents with respect to the individual gaseous components, there are also known adsorption processes, whose operation is based on the varying adsorption rates of the gaseous components on the adsorbents. The latter processes are used to separate gaseous mixtures if the equilibrium points of their gaseous components on the adsorbent employed do not permit separation, because the adsorbent attains equilibrium at substantially different rates for each component of the feed. Fractionation of air by adsorption of $O_2$ on carbon molecular sieves, which substantially exhibit, at the beginning of the adsorption, substantially different adsorption rates for nitrogen and oxygen is one example of a gas which is fractionated in a process based on different adsorption rates. Such an air fractionation process is disclosed, for example, in DOS (German Unexamined Laid-Open Application) No. 2,702,785, whose entire contents are incorporated herein by reference.

In the operation of such an adsorption process it is frequently difficult to adjust the amount of a product gas produced to a fluctuating demand without appreciably varying the content of the adsorbed component in the product gas. In general, such adsorption plants, operated cyclically, for example by the pressure swing adsorption method, are optimized, to deliver a substantially constant amount of a product gas having constant purity. In the operation of the adsorption processes utilizing the kinetic effect based on the differing adsorption rates of the feed gas components it was heretofore thought that the length of time of adsorption cycles cannot exceed certain time limits and that the rates of flow of feed gases must have certain minimum values, because otherwise, the adsorption due to the kinetic effect either would not take place or would occur only to a negligible extent. If it was desired to reduce the output of a product gas, in response to a decreased product gas demand, i.e., if it was desired to operate the adsorber in a partial-load mode, the procedure heretofore has been to temporarily shut down the adsorption plant at appropriate intervals and to collect the excess amount of product gas obtained in intermediate storage tanks. In addition to the initial investment cost of the storage tanks, another disadvantage of this mode of operation resides in that a certain period of time must first elapse with each renewed start-up of the plant until the product gas has attained the desired purity.

SUMMARY OF THE INVENTION

Accordingly, it is a primary object of this invention to provide an adsorption process, based on differential adsorption rates for feed gas components, which make it possible to effect an economical and flexible adjustment of the operation of the process, in response to the varying demand for a product gas.

Upon further study of the specification and appended claims, further objects and advantages of this invention will become apparent to those skilled in the art.

These and other objects are attained in accordance with this invention, by operating the adsorption cycle for variable periods of time and with variable throughflow rates, respectively, in response to a fluctuating demand for a product gas.

It has been surprisingly discovered that an adjustment of the quantity of the product gas in a manner provided herein is possible within a wide operating range ($\pm 20\%$ to 120%, preferably 40% to 110% of the optimum flow rate of product gas) without impairing the ability of the adsorber packing to separate feed gas constituents. This surprising result was unforeseeable inasmuch as the prior art taught that upon a prolonged contact of the gaseous mixture with the adsorbent, it was expected that the kinetic effect, and thus the separating effect of the adsorbent, would be substantially impaired or completely destroyed. Therefore, the process of this invention allows for a flexible and continuous control of the adsorption process in response to a fluctuating demand for a product gas.

The essence of the process of this invention is based substantially on the manner of conducting the adsorption phase, and it is independent of the manner in which the adsorption bed is regenerated. It is, therefore, irrelevant, if a pressure swing adsorption method is employed, whether the desorption is carried out under vacuum, at atmospheric pressure, by the introduction of a scavenging gas, a heated scavenging gas, or by the direct heating of the adsorbent with subsequent recooling.

The process of the invention is especially applicable to a partial-load operation, wherein the amount of a product gas required is reduced as compared to optimal operating conditions. Although the process of the invention is also applicable to an overload operation during which the amount of a product gas required is increased as compared to optimal operating conditions, such operation is of secondary importance in practice because the design of the adsorption plants generally does not permit the operation thereof under conditions substantially exceeding the design load.

It has been discovered that for each given purity of a product gas, there exists a functional correlation between the amount (or rate, i.e., volume per unit of time) of a product gas withdrawn from the adsorber and: (1) duration of the cycle, and (2) the amount of a feed gas introduced into the adsorber.

For each feed gas and for each desired product gas, the correlation is different and unique for that particular feed/product gas combination. Thus, for each of the combinations, the correlation must be established experimentally, prior to the operation of the process, as elaborated below. For each product gas purity, in each individual feed/product gas combination, the correlations between the volume of a product gas obtained and the cycle duration, and between the volume of a product gas obtained and the volume of feed gas delivered to the adsorber, are distinctive and, when represented graphically, follow a different curve. To avoid plotting a number of curves for each individual product gas purity, in accordance with this invention, for each individual feed/product gas combination there is determined $V_o$, volume of a product gas at a single constant length of time of the adsorption cycle (e.g. 2 minutes) as a function of a product gas purity. $V_o$ decreases with increasing product gas purity. Then, different values of volume (V) of a product gas are determined at different cycle durations for a given product gas purity. The values of V are then divided by the thus-obtained values of $V_o$ and the resulting dimensionless standardized quantity if correlated with a cycle duration, preferably graphically. Thus, if one desired to determine the length of time of the cycle necessary to obtain a given amount of a product gas having a certain purity, the value of $V_o$ is first determined for that product gas purity, the desired amount of the product gas is then divided by $V_o$, and the cycle duration is then determined from the graph of $V/V_o$ versus cycle duration.

It will be obvious to those skilled in the art that it is not necessary to represent the correlation in the form of a dimensionless quantity $V/V_o$ as a function of a cycle duration. Thus, the correlation can be represented in the form of several tables or graphs for each product gas purity.

In the operation of the process according to this invention, the length of time of the adsorption and desorption phases is varied for each cycle, while the length of time of the pressure buildup and of pressure relief phases remains constant. The quantitative output of the compressor delivering the feed gas mixture compressed to the adsorption pressure is dependent on and is controlled in relationship to the amount of a product gas withdrawn from the adsorber. In this connection, a direct substantially linear correlation generally exists, i.e., with a decreasing amount of a product gas, the amount of a feed gas mixture delivered to the adsorber also decreases.

Thus, according to one embodiment of the invention, the residual concentration of the adsorbed component in the product gas is maintained at a substantially constant level by controlling the volume of the product gas stream withdrawn during the adsorption phase from the adsorber. At the same time, the volume of a compressed gaseous feed mixture introduced into the adsorber during the adsorption phase is varied in relationship to the volume of the product gas withdrawn.

To operate the process according to this embodiment, a conventional sampling device and a variable control valve are installed in the product gas conduit. The degree of opening and the duration of opening of the valve are dependent on the desired product gas purity and are determined according to the aforementioned functional correlation between the duration of the cycle and the quantity of the product gas. As will be apparent to those skilled in the art, the length of the cycle and the duration of the adsorption phase have a known relationship, and in general the duration of the adsorption phase is a fixed fraction of the duration of the cycle.

The degree of opening and the duration of opening of the valve are controlled automatically, e.g. by a microprocessor in accordance with a correlation developed for each system of product/feed gas, as discussed above. The amount of feed gas supplied to the process is likewise controlled automatically.

The process of this invention is especially applicable to an adsorption process utilizing carbon molecular sieves as the adsorbent. Carbon molecular sieves, due to their inherent pore structure, exhibit kinetic adsorption effects, i.e. effects based on the differing adsorption rates of the feed gas components to a considerably larger extent than other commonly used adsorbents, such as zeolitic adsorbents. In this connection, the use of air as the gaseous feed mixture to be fractionated is particularly attractive, since the adsorptive air fractionation is gaining increasingly in importance. Enriched nitrogen, withdrawn as the product gas in this process, is widely used in industry, e.g. to flush oil tanks, to act as a diluent in adjusting thermal values of natural gas, and in the food industry. The residual gaseous fraction comprises substantially enriched oxygen and can be further treated to increase the concentration of oxygen therein in a conventional manner. However, the air fractionation with the use of carbon molecular sieves is only one example of a process which can utilize the present invention. The present invention can be utilized in all adsorption processes based on differing rates of adsorption of the gaseous constituents of a feed gas on a specific adsorbent. Thus, for example, the present invention can be used in processes of separating oxygen from crude argon, or nitrogen from natural gas, on carbon molecular sieves.

BRIEF DESCRIPTION OF THE DRAWING

The drawing is a graph of a dimensionless quantity $V/V_o$ as a function of cycle duration for the production of nitrogen-enriched product gas from air.

DETAILED DESCRIPTION OF THE INVENTION

The applicability of the process of this invention to the fractionation of air was tested on carbon molecular sieves as a typical adsorbent representative of the adsorbents in which kinetic adsorption effects, discussed above, are observed. Two adsorbers operated by a pressure swing adsorption method were utilized. The adsorption phase was operated under progressively increasing pressure, reaching pressure 6.0 bar at the end thereof, and it was followed by a rapid pressure relief to 3.5 bar. A desorption phase was operated under further decreasing pressure and an oxygen-containing residual gas was released during the desorption phase. At the end of the desorption phase the pressure reached 0.95 bar. Then, a rapid first pressure buildup phase was operated by pressure equalization simultaneously with the pressure relief phase of the second adsorber, until a first intermediate pressure of 3.5 bar was reached. A second pressure buildup phase followed and it was operated with raw air, until a second intermediate pressure of 4.2 bar was reached. The bed was then switched to the adsorption phase. The pressure equalization phase was conducted by passing gas from both ends of the second adsorber to both ends of the first adsorber and the second pressure buildup phase was conducted in a direction cocurrent to the direction of flow of the air during the adsorption phase.

With a duration of the entire cycle of 2 minutes, the duration of the adsorption phase was 54 seconds, of the pressure relief phase and of the first pressure buildup phase 3 seconds, of the desorption phase 57 seconds and of the second pressure buildup phase 3 seconds. With variation of the length of the cycle, the time periods of the pressure relief phase and of the pressure buildup phases remained constant in each case (i.e. the same as discussed above), and the time periods for the adsorption and the desorption phases were correspondingly altered, e.g. for a cycle length of time of 3 minutes, the duration of the adsorption phase was 84 seconds and of the desorption phase 87 seconds, for a cycle of 10 minutes, the duration of the adsorption and of the desorption phases were 294 seconds and 297 seconds, respectively. The adsorption temperature was 313° K. in all cases.

The amount of the product gas withdrawn was varied by an adjustable throttle valve installed in the product gas conduit and the volume of raw air fed into the adsorber was varied by a controllable feed gas compressor. The cycle length of time and thus the length of time of the adsorption phases were also varied. The composition of the product gas was measured constantly by a commercially available analyzer, for example a Beckman process oxygen monitor model 7003, installed in the product line. The compressor was operated to deliver the air at 6 bar. The cycle durations were varied from 1.33 to 10 minutes, and the content of oxygen in the nitrogen-rich product gas was varied from 0.2–4% by volume. For each paired set of values of residual oxygen content/cycle duration, the quantity of the product gas obtained was also recorded. From this recorded data, the curve represented in the figure was constructed. This curve represents the relationship between the volume of the product gas (V) and the cycle duration. In the figure $V_o$ represents the amount of the product gas withdrawn, which varies with the product gas purity, at a constant cycle length of time of 2 minutes. Thus, $V_o$ increases with a decreasing product gas purity. The dimensionless quantity $V/V_o$ is plotted on the ordinate as a function of the cycle duration (in minutes), plotted on the abscissa.

The optimal load operation is at $V = V_o$ and at a cycle duration of 2 minutes. The curve represents the range of the operation of the system from an overload operation exceeding the optimal load by about 10% up to a partial load operation of only about 25% of the optimal load. The short vertical bars entered at the individual measuring points for the various cycle durations on the curve indicate the fluctuations of the volume of the product gas measured for each product gas purity.

Some of the experimental data is summarized below in Tables A and B.

TABLE A

| Purity of Product Gas-<br>Residual Oxygen Content<br>in Product Gas<br>(% of Oxygen by Volume) | $V_o$ - Amount of Product<br>Gas at Cycle Length<br>of 2 mins (liters/min) |
|---|---|
| 0.2 | 2.47 |
| 0.6 | 4.07 |
| 1.0 | 5.02 |
| 1.4 | 5.74 |
| 1.8 | 6.38 |
| 2.2 | 7.03 |
| 2.6 | 7.64 |
| 3.0 | 8.21 |
| 3.4 | 8.74 |
| 3.8 | 9.23 |
| 4.0 | 9.50 |

TABLE B

| Residual Oxygen Content in Product Gas (% Oxygen by Volume) | Volume of Product Gas Obtained (V) (liters/min) | | |
|---|---|---|---|
| | Cycle Duration 1.33 mins | Cycle Duration 4 mins | Cycle Duration 8 mins |
| 0.2 | 2.81 | 1.79 | 0.91 |
| 0.6 | 4,37 | 2.66 | 1.33 |
| 1.0 | 5,40 | 3.27 | 1.63 |
| 1.4 | 6.31 | 3.72 | 1.94 |
| 1.8 | 7.14 | 4.14 | 2.13 |
| 2.2 | 7.90 | 4.48 | 2.28 |
| 2.6 | 8.59 | 4.79 | 2.43 |
| 3.0 | 9.31 | 5.17 | 2.58 |
| 3.4 | 9.96 | 5.47 | 2.70 |
| 3.8 | 10.56 | 5.81 | 2.81 |
| 4.0 | 10.87 | 6.00 | 2.89 |

For each given cycle duration, data similar to that set forth in Table B was obtained experimentally. The experimental data was standardized by dividing the values of V, from Table B, by the values of $V_o$, from Table A, for each corresponding product gas purity. The standardized values were then plotted as a function of the length of the cycle duration to produce the curve shown in the figure.

The curve is a very good approximation within the examined purity range from 0.2 to 4% by volume of oxygen in the product nitrogen. It is also seen from the curve that the cycle duration, and thus the duration of the adsorption phases, can be increased, without substantially impairing the desired product purity, by more than 400% as compared to the nominal load operation, while the amount of the product gas decreases to less than one-fourth.

The rate of feed of the raw gas (air) was regulated, while varying the remaining process variables so that a constant adsorption end pressure of 6 bar was maintained. Therefore, with decreasing amounts of the product gas withdrawn, the throughflow rate also decreased. Both variables, i.e. the amount of the product gas withdrawn, and the amount of the compressed raw air introduced, were substantially directly proportional at all oxygen gas concentrations, as exemplified in Table C below, for a constant residual oxygen content of 0.6% by volume in the product gas.

TABLE C

| V - Rate of<br>Withdrawal of Product Gas<br>(liters/min) | $V_{feed}$ - Rate of<br>Feed Gas (liters/min) |
|---|---|
| 4.07 | 78.54 |
| 4.37 | 27.06 |
| 2.66 | 72.24 |
| 7.33 | 7.74 |

The preceding examples can be repeated with similar success by substituting the generically or specifically described reactants and/or operating conditions of this invention for those used in the preceding examples.

From the forgoing description, one skilled in the art can easily ascertain the essential characteristics of this invention, and without departing from the spirit and scope thereof, can make various changes and modifications of the invention to adapt it to various usages and conditions.

What is claimed is:

1. In an adsorption process for the fractionation of a gaseous mixture comprised of at least two gaseous components, by an adsorbent which has different kinetic effect adsorption characteristics for each of said at least two gaseous components, the process comprising an adsorption phase wherein the gaseous mixture is passed through an adsorber packed with the adsorbent wherein at least one component of the gaseous mixture is preferentially adsorbed, thereby simultaneously producing a product gas enriched in the remaining components of the gaseous mixture, withdrawing the product gas from the adsorber and subsequently regenerating the adsorber, the improvement comprising adjusting the length of time of operation of the adsorption phase and the rate of flow of said gaseous mixture through the adsorber in response to a fluctuating demand for the product gas.

2. A process according to claim 1, wherein at a constant concentration of the preferentially adsorbed at least one component of the gaseous mixture in the product gas, the rate of flow of the gaseous mixture through the adsorber is varied by adjusting the rate of flow of the product gas withdrawn from the adsorber during the adsorption phase.

3. A process according to claim 2, wherein the rate of flow of the gaseous mixture introduced into the adsorber during the adsorption phase is varied in direct proportion to the rate of flow of the product gas.

4. A process according to claim 3, wherein said adsorbent comprises carbon molecular sieves.

5. A process according to claim 4, wherein said gaseous mixture is air, and said product gas comprises a nitrogen-enriched gas stream.

6. A process according to claim 1, wherein the adjustment of the length of time of operation of the adsorption phase and of the rate of flow of the gaseous mixture through the adsorber is effected according to a correlation of a rate of flow of the product gas as a function of the length of time of operation of the adsorption phase.

7. A process according to claim 6, wherein said correlation is determined experimentally for each specific gaseous mixture/product gas combination.

8. A process according to claim 7, wherein, in determining said correlation, the rate of flow (V) of the product gas for each value of the length of time of the adsorption phase is divided by the rate of flow of the product gas ($V_o$) at a constant length of time of the adsorption phase, $V_o$ being dependent on a specific concentration of the preferentially adsorbed component in the product gas.

9. A process according to claim 1 further comprising adjusting the length of time of operation of the adsorption phase and the rate of flow of said gaseous mixture through the adsorber to meet a product gas demand of between 20% and 120% of the optimum flow rate of the product gas of the adsorber.

10. In an adsorption process for the fractionation of a gaseous mixture comprised of at least two gaseous components, wherein an adsorbent is adapted to adsorb each of said at least two gaseous components at different rates through means of the specific kinetic effect between each one of said at least two gaseous components and the specific adsorbent used, the process including an adsorption phase wherein said gaseous mixture is passed through an adsorber packed with said adsorbent whereby at least one gaseous component of said gaseous mixture is preferentially adsorbed, thereby simultaneously producing a product gas enriched in the remaining components of the gaseous mixture, withdrawing product gas from the adsorber and subsequently regenerating the adsorber, the improvement comprising: adjusting the length of time of operation of the adsorption phase in inverse proportion and the rate of flow of said gaseous mixture through the adsorber in direct proportion to a fluctuating demand for the product gas whereby operation of the adsorption phase for different periods of time with corresponding different gaseous mixture flow rates can be accomplished for meeting a specific product gas demand without shutting down the adsorber.

11. In an adsorption process for the fractionation of a gaseous mixture comprised of at least two gaseous components, wherein an adsorbent is adapted to adsorb each of said at least two gaseous components at different rates through means of the specific kinetic effect between each one of said at least two gaseous components and the specific adsorbent used, the process including an adsorption phase wherein said gaseous mixture is passed through the adsorber in a direct proportion correlating the rate of flow of the product gas as a function of the length of time of operation of the adsorption phase, the correlation being determined as a function of the rate of flow (V) of a specific product gas for each value of length of time of operation of the adsorption phase divided by the rate of flow of the specific product gas ($V_o$) for a constant length of time of operation of the adsorption phase, said value ($V_o$) being dependent on a specific concentration of the specific preferentially adsorbed component in the specific product gas, said correlation being used to adjust the rate of flow of said gaseous mixture and time of operation of the adsorption phase whereby operation of the adsorption phase for different periods of time with corresponding different gaseous mixture flow rates can be accomplished for meeting a specific product gas demand without shutting down the adsorber.

12. A process according to claim 11 wherein said adjusting of the length of time of said adsorption phase and the rate of flow of said gaseous mixture is performed to meet a product gas demand of between 40% and 110% of the optimum flow rate of the product gas of the adsorber.

* * * * *